United States Patent
Chen

(10) Patent No.: US 11,774,073 B1
(45) Date of Patent: Oct. 3, 2023

(54) FOLDABLE CLAMP-ON DESK LAMP WITH MULTI-ANGLE ADJUSTMENT FUNCTION

(71) Applicant: Xiaohong Chen, Hainan (CN)

(72) Inventor: Xiaohong Chen, Hainan (CN)

( * ) Notice: Subject to any disclaimer, the term of this patent is extended or adjusted under 35 U.S.C. 154(b) by 0 days.

(21) Appl. No.: 17/975,801

(22) Filed: Oct. 28, 2022

(51) Int. Cl.
| | | |
|---|---|---|
| *F21V 21/12* | (2006.01) | |
| *F21V 21/088* | (2006.01) | |
| *F21V 21/26* | (2006.01) | |
| *F21V 21/116* | (2006.01) | |
| *F16C 11/10* | (2006.01) | |

(52) U.S. Cl.
CPC .............. *F21V 21/12* (2013.01); *F16C 11/10* (2013.01); *F21V 21/088* (2013.01); *F21V 21/116* (2013.01); *F21V 21/26* (2013.01); *Y10T 403/32319* (2015.01)

(58) Field of Classification Search
CPC ...... F21V 21/108; F21V 21/116; F21V 21/26; F21V 21/088; F21V 21/0885; F16C 11/10; F16C 11/103; Y10T 403/32254; Y10T 403/32262; Y10T 403/32286; Y10T 403/32532; Y10T 403/32606; Y10T 403/32951
See application file for complete search history.

(56) References Cited

U.S. PATENT DOCUMENTS

| | | | |
|---|---|---|---|
| 3,662,323 A | | 5/1972 | Stanback |
| 4,213,172 A | * | 7/1980 | Scattolin ............... F21V 29/505 362/373 |
| 4,295,308 A | | 10/1981 | Korfanta |
| 4,432,042 A | * | 2/1984 | Zeller ................. F21V 33/0048 362/197 |
| 4,772,991 A | | 9/1988 | Wood |
| 4,885,667 A | | 12/1989 | Selden |
| 5,097,400 A | * | 3/1992 | Cvek .................... F16M 11/105 362/345 |
| D325,648 S | * | 4/1992 | Cerbini .......................... D26/65 |

(Continued)

FOREIGN PATENT DOCUMENTS

| | | | | |
|---|---|---|---|---|
| CA | 2484675 A1 | * | 4/2006 | ............... F21S 9/02 |
| CN | 105650536 A | * | 6/2016 | |

(Continued)

*Primary Examiner* — Jonathan P Masinick

(57) ABSTRACT

A foldable clamp-on desk lamp with a multi-angle adjustment function includes: a lamp base part, a clamping base, several supporting rods, and detachable rotating shaft assemblies through which the several supporting rods are movably connected and the lamp base part is connected to the uppermost supporting rod. The lowermost supporting rod is detachably connected to the clamping base. The detachable rotating shaft assemblies can achieve folding and telescopic functions, complete disassembly, repeated disassembly, assembly and change, and long service life. By the design combining a Fresnel lens and convolutional lines, light is continuously scattered and recombined when passing through the convolutional lines, so that the outgoing light is more uniformly, soft, and not dazzling. A plurality of inserting holes are formed at the upper side and top end of the clamping base, thereby facilitating multi-directional assembling of the supporting rods and achieving wide application of the clamping position.

10 Claims, 6 Drawing Sheets

(56) References Cited

U.S. PATENT DOCUMENTS

| | | | |
|---|---|---|---|
| 5,180,220 A * | 1/1993 | Van Kalsbeek | F21V 21/088 362/396 |
| 5,214,458 A * | 5/1993 | Kanai | G09F 19/18 353/65 |
| 5,689,999 A * | 11/1997 | Wiley | F16C 11/10 403/107 |
| 6,577,495 B2 | 6/2003 | West | |
| 6,669,155 B2 * | 12/2003 | Ron | F16C 11/10 248/176.1 |
| 6,896,230 B2 * | 5/2005 | Cvek | F16M 11/10 248/276.1 |
| 8,516,769 B2 | 8/2013 | Hanig et al. | |
| 9,228,729 B2 | 1/2016 | Polick et al. | |
| 10,060,468 B2 * | 8/2018 | Whitney | E04F 10/0614 |
| 10,246,840 B2 | 4/2019 | Meek et al. | |
| 10,253,926 B1 | 4/2019 | Fan | |
| 10,260,551 B2 | 4/2019 | Aguilar | |
| 10,490,177 B2 | 11/2019 | Manzo et al. | |
| 11,326,756 B1 | 5/2022 | Datz et al. | |
| 2005/0007778 A1 | 1/2005 | Lin | |
| 2009/0039222 A1 | 2/2009 | Haarmann | |
| 2009/0180284 A1 * | 7/2009 | Lin | F21V 29/763 362/294 |
| 2012/0126268 A1 * | 5/2012 | Seo | G02B 3/0056 257/40 |
| 2016/0079687 A1 | 3/2016 | Holland et al. | |
| 2017/0009941 A1 | 1/2017 | Chen | |
| 2017/0265302 A1 | 9/2017 | Kim | |
| 2019/0119940 A1 | 4/2019 | Hill | |
| 2019/0145091 A1 | 5/2019 | Skinner et al. | |
| 2020/0003253 A1 * | 1/2020 | Ng | F16C 11/045 |
| 2020/0363010 A1 | 11/2020 | Huang et al. | |
| 2021/0088190 A1 | 3/2021 | Okahisa et al. | |
| 2021/0247045 A1 | 8/2021 | Simchak | |
| 2022/0074570 A1 | 3/2022 | Jalbout et al. | |
| 2022/0077935 A1 | 3/2022 | Jalbout et al. | |

FOREIGN PATENT DOCUMENTS

| | | | | |
|---|---|---|---|---|
| CN | 105937725 A | * | 9/2016 | |
| CN | 207070414 U | * | 3/2018 | |
| CN | 108826070 A | * | 11/2018 | |
| CN | 208185979 U | * | 12/2018 | |
| CN | 211551252 U | * | 9/2020 | |
| CN | 112413437 A | * | 2/2021 | |
| DE | 202015001860 U1 | * | 8/2015 | F21S 6/003 |
| KR | 20110121141 A | * | 11/2011 | |
| KR | 20140000882 U | * | 2/2014 | |
| KR | 20140142472 A | * | 12/2014 | |
| WO | WO-2022199303 A1 | * | 9/2022 | |

* cited by examiner

FOLDABLE CLAMP-ON DESK LAMP WITH MULTI-ANGLE ADJUSTMENT FUNCTION

FIELD OF TECHNOLOGY

The present disclosure relates to the technical field of desk lamps, and in particular to a foldable clamp-on desk lamp with a multi-angle adjustment function.

BACKGROUND

A desk lamp generally refers to an electric lamp with a base placed on a desk. However, with the progress of science and technology, the appearance and shape of the desk lamp are constantly developing, and some forms such as a clamp-on desk lamp, a magnetic suction desk lamp and a foldable desk lamp have gradually appeared. Although existing desk lamps have various styles, but still have the following shortcomings to be solved:
1. The existing desk lamps basically adopt a PC board, that is, a common light guide plate. A light source is directly transmitted after the intensity of light is weakened by the PC board, so the light is not soft, and is non-uniform easy to age, yellow and crack, and relatively dazzling.
2. A rotating shaft of an existing foldable desk lamp is integrated through injection molding, cannot be disassembled, assembled and changed, has short service life, is easy to damage and must be completely replaced after being damaged.
3. A clamping base and a desk lamp main body part of an existing clamp-on desk lamp only can be connected in one direction, so the clamping direction and position are limited.

SUMMARY

An objective of the present disclosure is to provide a foldable clamp-on desk lamp with a multi-angle adjustment function, which can effectively solve the above problems.

The technical solution of the present disclosure is: a foldable clamp-on desk lamp with a multi-angle adjustment function includes: a lamp head part 1, a clamping base 2, several supporting rods 3 and detachable rotating shaft assemblies 4, where the several supporting rods 3 are movably connected through the detachable rotating shaft assemblies 4, the lamp base part 1 is connected to the uppermost one of the supporting rods 3 through the detachable rotating shaft assembly 4, and the lowermost one of the supporting rods 3 is detachably connected to the clamping base 2.

Further, each of the detachable rotating shaft assemblies 4 includes a first fastener 41, a second fastener 42, and, a hexagonal, rotating shaft 43 for connecting the two fasteners.

Further, the hexagonal rotating shaft 43 includes a hexagonal bolt 431, a hexagonal rotating piece 432 and a hexagonal locking nut 433, where the hexagonal rotating piece 432 is sleeved on the hexagonal bolt 431, and a moment of the rotating shaft is adjusted through the threaded connection between the hexagonal locking nut 433 and the hexagonal bolt 431.

Further, the first fastener 41 includes a first connecting head part 411 and a first connecting rod part 412, where the first connecting head part 411 is provided with a first hexagonal hole 4111 and a circular hole 4112 sequentially from outside to inside, the first hexagonal hole 4111 is in matched connection with the hexagonal rotating piece 432, a first plug cover 4113 is arranged on an outer side of the first connecting head part 411 and the first connecting, rod part 412 is in inserted connection with the corresponding supporting rod 3.

Further, a distance between opposite sides of the first hexagonal hole 4111 is greater than a diameter of the circular hole 4112.

Further, the second fastener 42 includes a second connecting head part 421 and a second connecting rod part 422, where a second hexagonal hole 4211 is formed in an inner side of the second connecting head part 421, the second hexagonal hole 4211 is in matched connection with a head end of the hexagonal bolt 431, a second plug cover 4212 is arranged on an outer side of the second connecting head part 421, and the second connecting rod part 422 is in inserted connection with the corresponding supporting rod 3.

Further, a light source 11 is arranged in the lamp base part 1, the light source 11 adopts a Fresnel optical lens, and the Fresnel optical lens is provided with a plurality of convolutional lines.

Further, a rear projection lamp 32 is arranged on the first supporting rod 3 from, top to bottom, and a touch switch 33 is arranged on the second supporting rod 3.

Further, a lower end of one side of the lamp base part 1 is vertically connected to an additional rod 12, and a lower end of the additional rod 12 is movably connected to the uppermost one of the supporting rods 3 through the detachable rotating shaft assembly 4.

Further, the clamping base 2 includes a U-shaped base 21, an adjusting rod 22, a bolt 23 and a pressing plate 24, where a plurality of inserting holes 211 and locking holes 212 are formed in the upper side and top end of the U-shaped base 21, an inserting rod 31 is arranged below the lowermost one of the supporting, rods 3, and the inserting rod 31 is inserted into the inserting hole 211 and is in threaded connection with the locking hole 212 through a locking nail 213 to be locked and fixed, a lower part of the U-shaped base 21 is provided with a threaded hole and is in threaded connection with an adjusting rod 22, the pressing plate 24 is fixed above the adjusting rod 22, and the bolt 23 is inserted in a lower part of the adjusting rod 22.

The present disclosure has the following beneficial effects:

the present disclosure adopts the detachable rotating shaft assemblies, so the desk lamp can achieve the folding and telescopic functions, can be completely disassembled, can be disassembled, assembled and changed repeatedly, and has long service life. By adoption of the design combining a Fresnel lens and convolutional lines, light is continuously scattered and recombined when passing through the convolutional lines, so that the outgoing light is more uniformly, soft and not dazzling. A plurality of inserting holes are formed at the upper side and the top end of the clamping base, thereby facilitating multi-directional assembling of the supporting rods and achieving wide application of the clamping position.

BRIEF DESCRIPTION OF THE DRAWINGS

The drawings of the specification that constitutes a part of the present application are used to provide a further understanding of the present disclosure. The exemplary embodiments of the present disclosure and the description thereof are used to explain the present disclosure, and do not constitute an improper limitation of the present disclosure. In the drawings.

Figure 1:
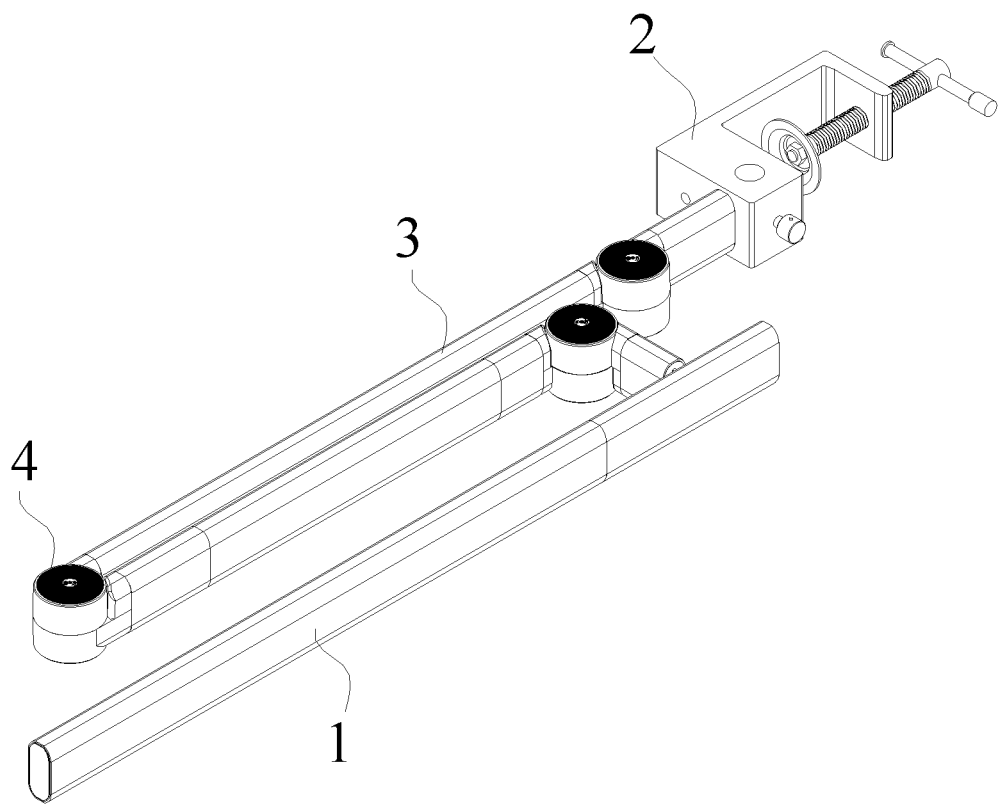
FIG. 1 is a schematic diagram of an overall structure (a folded state) according to Embodiment 1 of the present disclosure.

In the drawings: 1. Lamp base part; 11. Light source; 12. Additional rod; 2. Clamping base; 21. U-shaped base; 211. Inserting hole; 212. Locking hole; 213. Locking nail; 22. Adjusting rod; 23. Bolt; 24. Pressing plate; 3. Supporting rod; 31; Inserting rod; 32. Rear projection lamp; 33. Touch switch; 4. Detachable rotating shaft assembly; 41. First fastener; 411. First connecting head part; 4111. First hexagonal hole; 4112. Circular hole; 4113. First plug cover; 412. First connecting rod part; 42. Second fastener; 421. Second connecting head part; 4211. Second hexagonal hole; 4212. Second plug cover; 422. Second connecting rod part; 43. Hexagonal rotting shaft; 431. Hexagonal bolt; 432. Hexagonal rotating piece; 433. Hexagonal locking nut.

DETAILED DESCRIPTION OF THE EMBODIMENTS

The present disclosure is described in detail below with reference to the accompanying drawings and embodiments. Each example is provided to explain the present disclosure instead of limiting the present disclosure. In fact, those skilled in the art, will appreciate that modifications and variations may be made in the present disclosure without departing from the scope or spirit of the present disclosure. For example, features shown or described as one part of one, embodiment may be applied to another embodiment to generate yet another embodiment. Therefore, it is expected that the present disclosure includes such modifications and variations that fall within the scope of the appended claims and their equivalents. The specification and accompanying drawings are used to enable those skilled in the art to manufacture and use the present disclosure, and are not intended to limit the scope of the present disclosure. In terms of the disclosed method, the presented steps are essentially exemplary; therefore, unless otherwise disclosed, the order of the steps is not necessary or critical.

The following description of technology is merely exemplary in nature of subjects, manufacturing and use of one or more inventions, and is not intended to limit the scope, application or use of any specific invention claimed in the present application or other applications that may be submitted to claim the priority of the present application, or the patents issued therefrom. With regard to the disclosed method, the order of the presented steps is essentially exemplary; therefore, in various embodiments, the order of the steps may be different, including the case where some steps may be performed at the same time, unless otherwise explicitly stated. As used herein, "a" and "an" indicate the presence of "at least one" term; and where possible, a plurality of such terms may be present. Unless other explicitly stated, when the widest scope of the technology, all numeral values in the specification should be understood as modified by the word "about", and all geometric and spatial descriptors should be understood as modified by the word "substantially". When applied to the numerical values, "about" indicates that calculation or measurement allows the numerical values to have some slight inaccuracy (some of numerical values are close to accuracy; approximately or reasonably close to the numerical value; almost). If, for some reason, the inaccuracy caused by "about" and/or "substantially" cannot b understood in this common sense in the art, "about" and "substantially" as used herein at least indicate the possible changes of the common methods of measuring or using these parameters.

Unless otherwise specified, all documents cited in the specific embodiments, including patents, patent application and scientific documents, are incorporated herein by reference. In case of any conflict or ambiguity between the documents incorporated by reference and this specific embodiment, this specific embodiment shall prevail.

Although the open term "including", which is a synonym of non-restrictive term such as including, containing or having, is used to describe and claim the embodiments protecting the technology, but the embodiments may optionally be described by more restrictive terms such as "consisting of" or "basically consisting of".

As described herein, unless otherwise stated, all composition percentages are based on the weight of the total composition. Unless otherwise stated, the disclosed content of the range includes an endpoint, and includes all different values in the whole range and the further divided range. Therefore, for example, the range of "from A to B" or "from about A to about B" includes A and B. The contents of the values and the value ranges of specific parameters (such as quantity and weight percentage) do not exclude effective other values and value ranges. It is conceivable that two or more specific example values of a given parameter may define the endpoint of the value range claimed to be protected by the parameter.

When an element or layer is referred to as "on another element or layer", "joined to another element or, layer", "connected to another element or layer" or "coupled to another element or layer", the element or layer may be directly on another element or layer, joined to another element or layer, connected to another element or layer or coupled to another element or layer, or an intermediate element or layer may be present. On the contrary, when an element is referred to as "directly on another element or layer", "directly joined to another element or layer", "directly connected to another element or layer" or "directly coupled to another element or layer", an intermediate element or layer may not be present. Other words for describing the relation between elements should be interpreted in a similar way (for example, "between" and "directly between", and "adjacent" and "directly adjacent"). As used herein, the term "and/or" includes any combination and all combinations of one or more of the associated listed items.

Although terms such as first, second and third may be used here to describe various elements, parts, areas, layers and/or portions, these elements, parts, areas, layers and/or portions should not be limited by these terms. These terms are only used to distinguish one element, part, area, layer or portion from another area, layer or portion. Unless the context clearly indicates, terms such as "first" and "second" and other numerical terms used herein do not indicate order or sequence. Therefore, without departing from the instruction of the exemplary embodiments, a first element, part, area, layer or portion discussed below may be referred to as a second element, part, area, layer or portion. The accompanying drawings show one or more examples of the present disclosure. The detailed description uses reference numerals and letters to refer to the features in the accompanying drawings. Similar numeral references in the drawings and description have been used to refer to the similar parts in the present disclosure. As used herein, the terms "first", "second" and "third" are used interchangeably to distinguish one component from another component, and are not intended to indicate the position or importance of individual components.

Spatial opposite terms, such as "inner", "outer", "below", "below", "under", "above" and "over", may be used here to describe the relation between one element or feature shown in the figure and another element or feature. In addition to the orientation shown in the figure, the spatial opposite terms may be intended to cover different orientations of the device in use or operation. For example, if the device in the figure is turned over, the element which is described as "below" or "under" other elements or features will be oriented as "above" other elements or features. Therefore, the exemplary term "below" may cover both two orientations such as above and below. The device may be additionally positioned (rotated by 90 degrees or located at other orientations), and may correspondingly explain the spatial opposite descriptors used herein. In the description of the present disclosure, orientation or position relationships indicated by terms "longitudinal", "transverse", "upper", "lower", "front", "rear", "left", "right", "vertical", "horizontal", "t p", "bottom" and the like are orientation or position relationships shown in the drawings, and these terms are merely for facilitating description of the present disclosure, but not for requiring that the present disclosure must be constructed and operated in a specific orientation, and thus, these terms cannot be understood as a limitation to the present disclosure. As used in the present disclosure, the terms "connected", "connection" and "set" should be understood in a broad sense, for example, they may be fixed connection or detachable connection, they may be direct connection or indirect connection through an intermediate part; or they may be wired connection and wireless connection, or may be connection through a wireless communication signal. For those of ordinary skill in the field, the specific meanings of the terms may be understood according to the specific conditions.

Embodiment 1

As shown in FIG. 1, a foldable clamp-on desk lamp with a multi-angle adjustment function includes: a lamp base part 1, a clamping base 2, several supporting rods 3 and detachable rotating assemblies 4, where the several supporting rods 3 are movably connected through the detachable rotating shaft assemblies 4, the lamp base part 1 is connected to the uppermost one of the supporting rods 3 through the detachable rotating shaft, assembly 4, and the lowermost, one of the supporting rods 3 is detachably connected to the clamping base 2.

Figure 4:
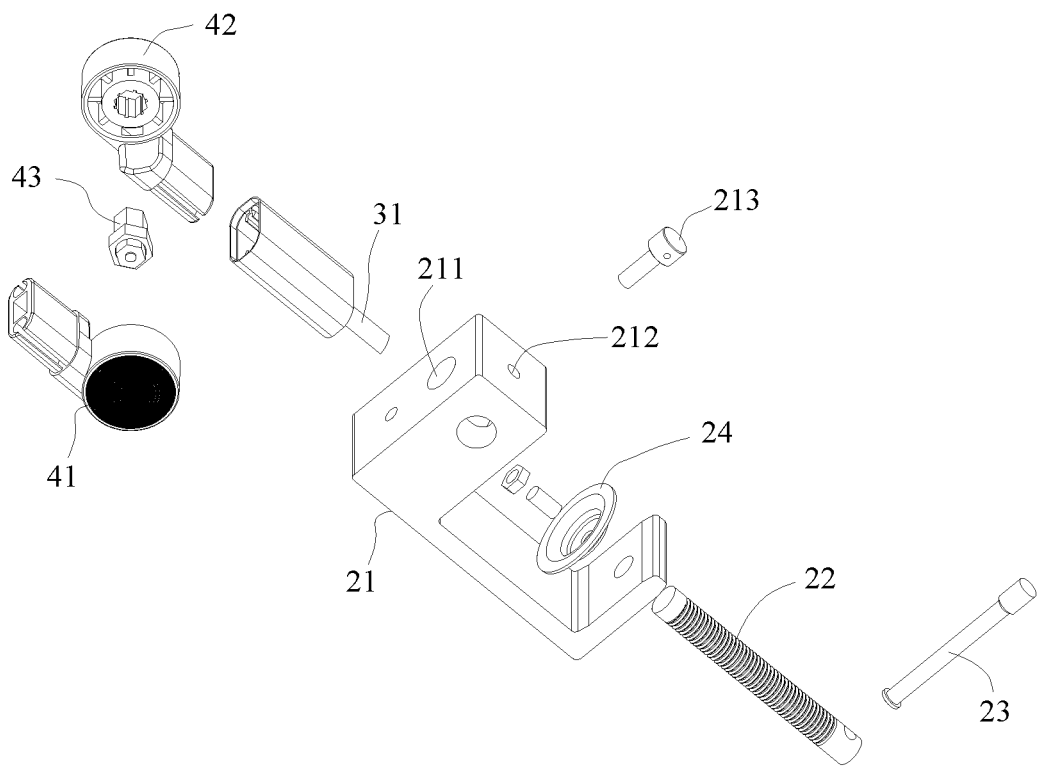
FIG. 4 is an exploded view of parts between a detachable rotating assembly and a clamping base according to Embodiment of the present disclosure.

As shown in FIG. 4, each of the detachable rotating shaft, assembly 4 includes a first fastener 41, a second fastener 42, and a hexagonal rotating shaft 43 for connecting the two fasteners. The first fastener 41 and the second fastener 42 may rotate relatively through the hexagonal rotating shaft 43.

Figure 5:
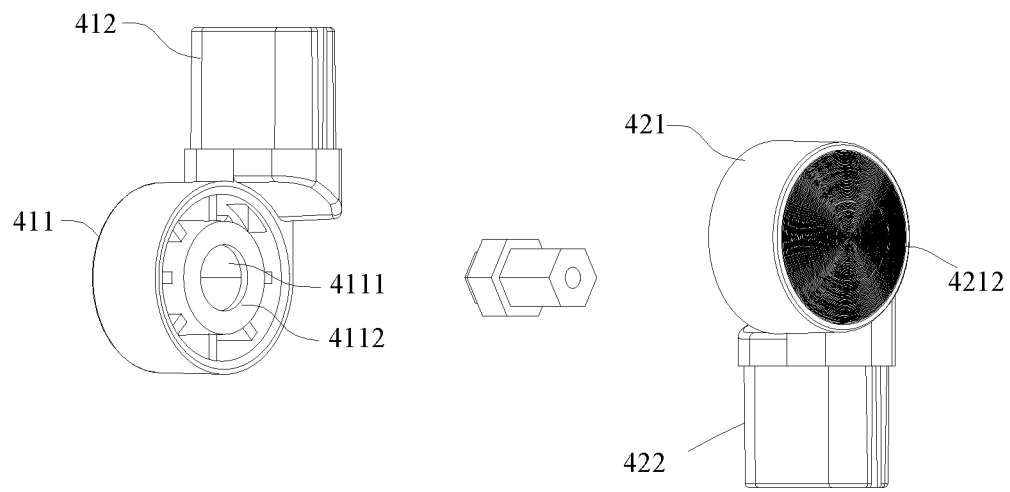
FIG. 5 is a first exploded view of parts of a detachable rotating assembly according to Embodiment 1 of the present disclosure.
Figure 6:
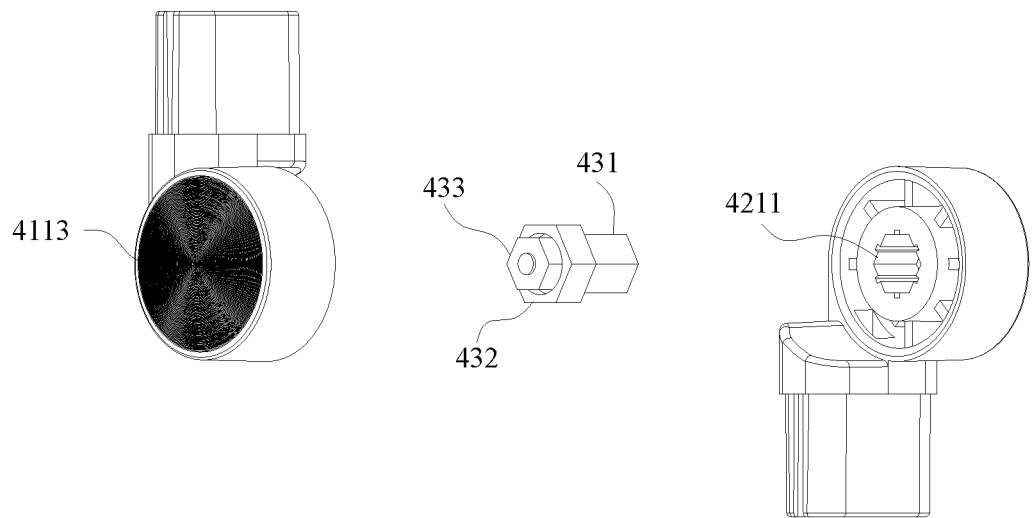
FIG. 6 is a second exploded view of parts of a detachable rotating assembly according to Embodiment 1 of the present disclosure.
Figure 8:
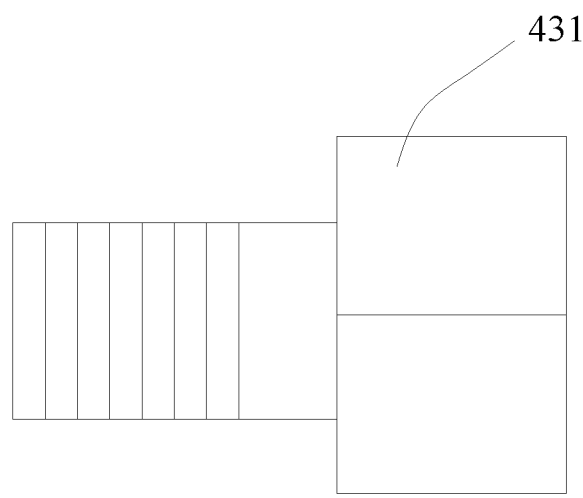
FIG. 8 is a hexagonal bolt according to Embodiment 1 of the present disclosure.
Figure 9:
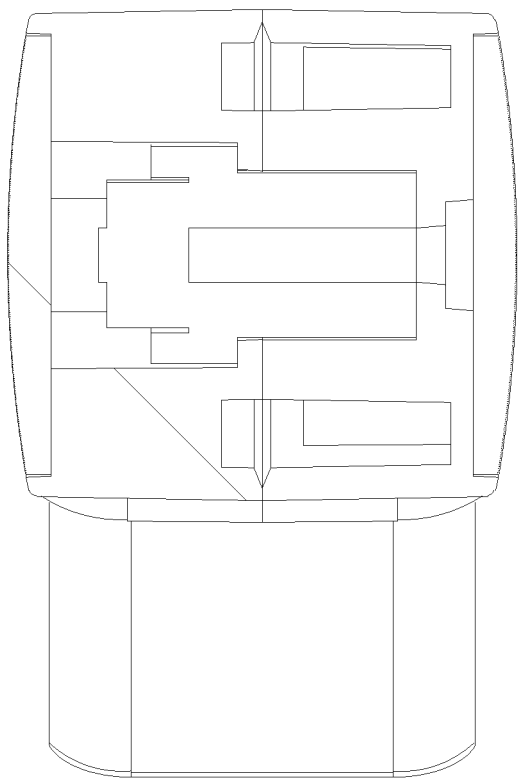
FIG. 9 is an internal sectional view of a detachable rotating assembly according to Embodiment 1 of the present disclosure.

Further, as shown in FIG. 5, FIG. 6 and FIG. 8, the hexagonal rotating shaft 43 includes a hexagonal bolt 431, a hexagonal rotating piece 432 and a hexagonal locking nut 433, where the hexagonal rotating piece 432 is sleeved on the hexagonal bolt 431, and a moment of the rotating shaft is adjusted through threaded connection between the hexagonal locking nut 433 and the hexagonal bolt 431.

Figure 7:
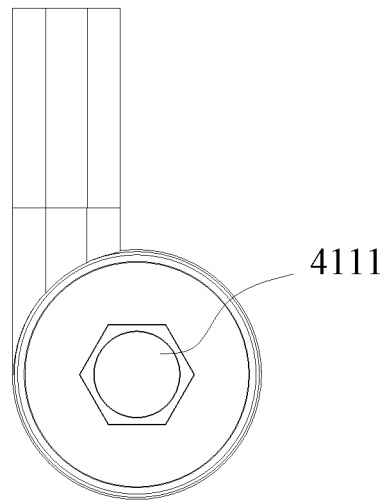
FIG. 7 is a structural schematic diagram of a first hexagonal hole on an outer side of a first fastener according to Embodiment 1 of the present disclosure.
Figure 10:
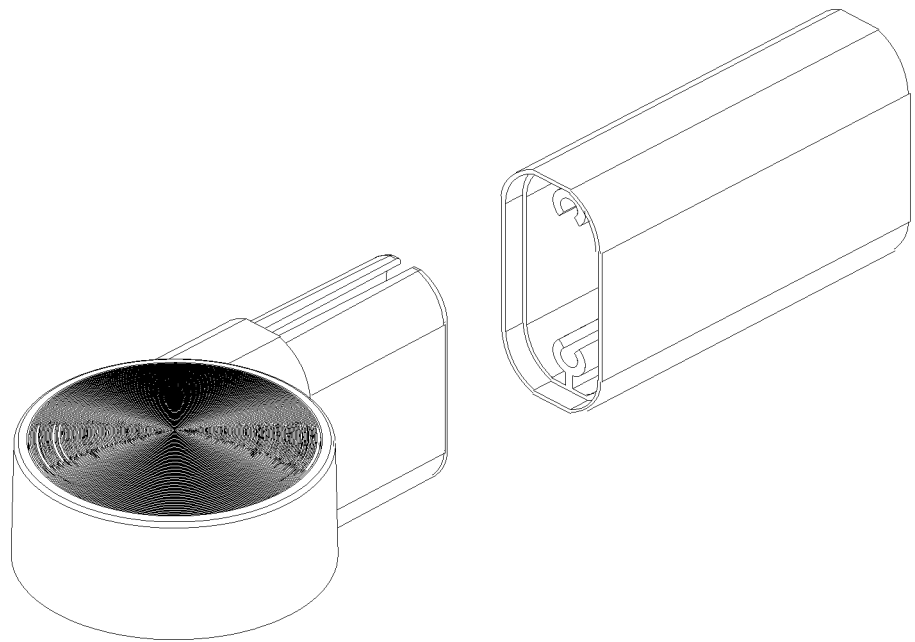
FIG. 10 is a schematic diagram of inserted connection between a detachable rotating assembly 4 and a supporting, rod 3 according to Embodiment 1 of the present disclosure.

Further, as shown in FIG. 5, FIG. 6 and FIG. 7, the first fastener 41 includes a first connecting head part 411 and a first connecting rod part 412, where the first connecting head part 411 is provided with a first hexagonal hole 4111 and a circular hole 4112 sequentially from outside to inside, the first hexagonal hole 4111 is in matched connection with the hexagonal rotating piece 432, a first plug cover 4113 is arranged on an outer side of the first connecting head part 411, the first connecting rod part 412 is in inserted connection with the corresponding supporting rod 3, the inserted connection structure is shown in FIG. 10, and a distance between opposite sides of the first hexagonal hole 4111 is greater than a diameter of the circular hole 4112.

Further, as shown in FIG. 5 and FIG. 6, the second fastener 42 includes a second connecting head part 421 and a second connecting rod part 422, where a second hexagonal hole 4211 is formed in an inner side of the second connecting head part 421, the second hexagonal hole 4211 is in matched connection with a head end of the hexagonal bolt 431, a second plug cover 4212 is arranged on an outer side of the second connecting head part 421, the second connecting rod part 422 is in inserted connection with the corresponding supporting rod 3, and the inserted connection structure is shown in FIG. 10.

When the detachable rotating shaft assembly 4 is mounted, the hexagonal rotating shaft 43 is inserted from the first hexagonal hole 4111 of the first fastener 41, the hexagonal rotating piece 432 is limited in the first hexagonal hole 4111, the hexagonal bolt 431 and the second hexagonal hole 4211 of the second fastener 42 are limited after the hexagonal bolt 431 passes through the circular hole 4112, and then the first plug cover 4113 and the second plug cover 4212 on two sides are mounted.

Through the detachable rotating shaft assemblies 4, the desk lamp may better achieve folding and telescopic functions, can be disassembled completely, can be disassembled, assembled and changed repeatedly, and has long service life.

Figure 2:
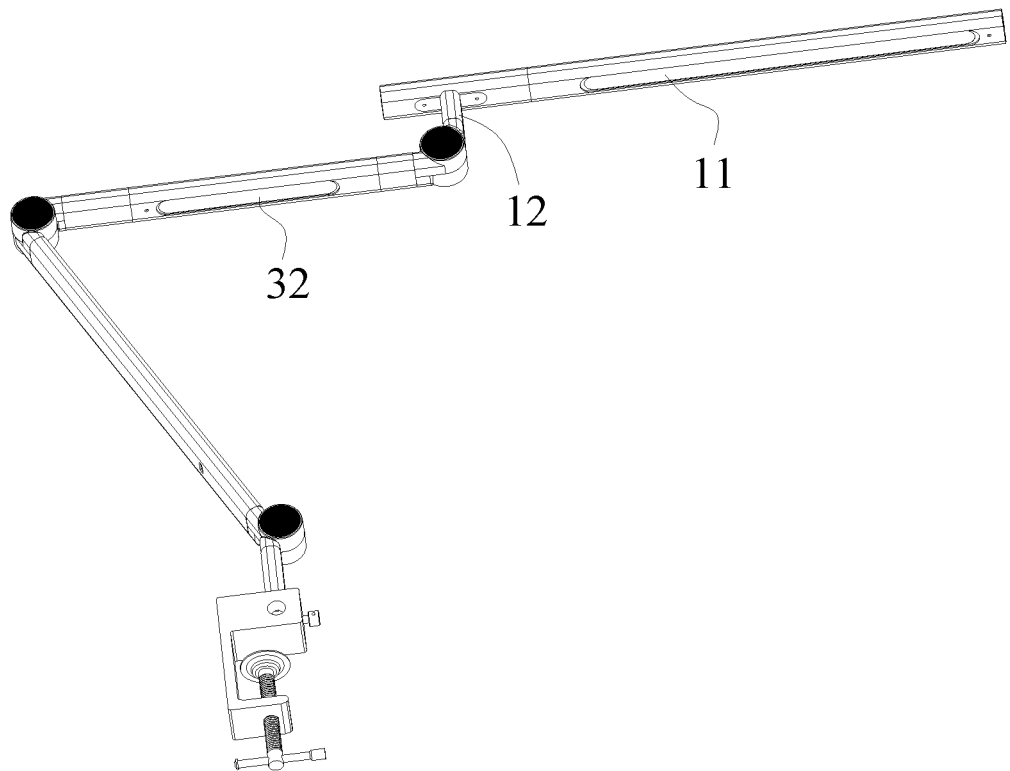
FIG. 2 is a schematic diagram of an overall structure (a first unfolded state) according to Embodiment 1 of the present disclosure.
Figure 3:
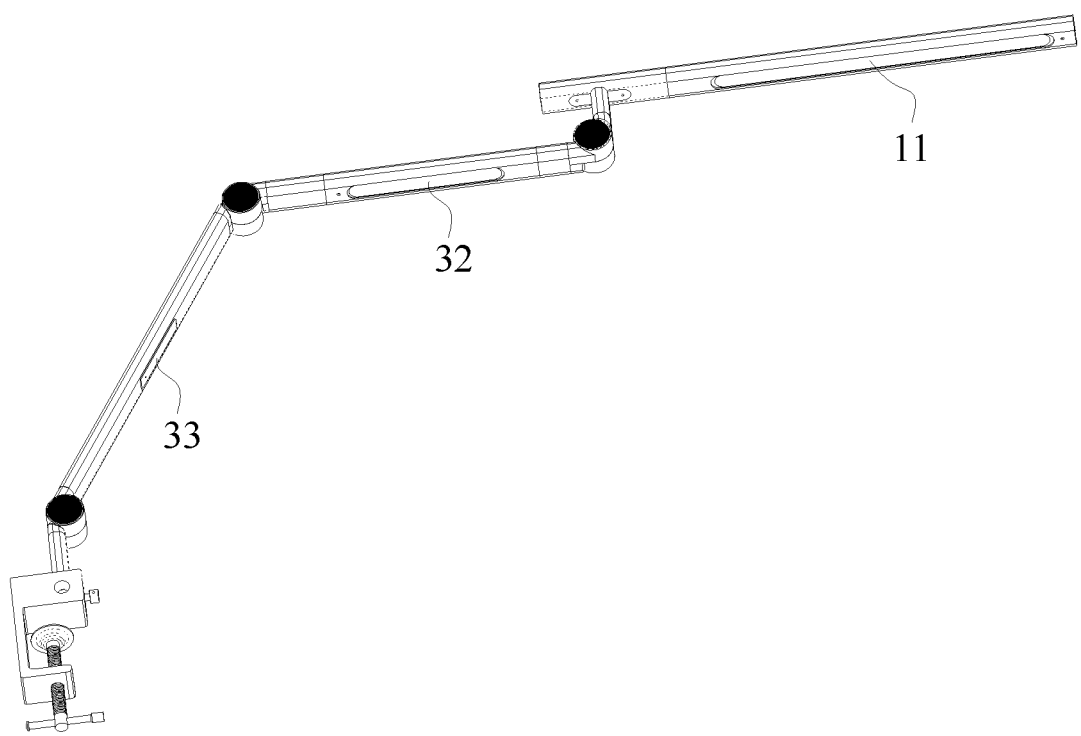
FIG. 3 is a schematic diagram of an overall structure (a second unfolded state) according to Embodiment 1 of the present disclosure.

As shown in FIG. 2 and FIG. 3, a light source 11 is arranged in the lamp head part 1, the light source 11 adopts a Fresnel optical lens, and the Fresnel optical lens is provided with a plurality of convolutional lines; and by adoption of the design combining the Fresnel optical lens with the convolutional lines, light is continuously scattered and recombined when passing through the convolutional lines, so that the outgoing light is more uniformly, soft and not dazzling.

As shown in FIG. 2 and FIG. 3, a rear projection lamp 32 is arranged on the first supporting rod 3 from top to bottom, and a touch switch 33 is arranged on the second supporting rod 3.

As shown in FIG. 1, FIG. 2 and FIG. 3, a lower end of one side of the lamp base part 1 is vertically connected to an additional rod 12, and a lower end of the additional rod 12 is movably connected to the uppermost one of the supporting rods 3 through the detachable rotating shaft assembly 4.

As shown in FIG. 4, the clamping base 2 includes a U-shaped base 21, an adjusting rod 22, a bolt 23 and a pressing plate 24; a plurality of inserting holes 211 and locking holes 212 are formed at, the upper side and, the top end of the U-shaped base 21, an inserting rod 31 is arranged below the lowermost one of the supporting rods 3, and the inserting rod 31 is inserted into the inserting hole 211 and is in threaded connection with the locking hole 212 through a locking nail 213 to be locked and fixed; a lower part of the U-shaped base 21 is provided with a threaded hole and is in threaded connection with the adjusting rod 22, the pressing plate 24 is fixed above the adjusting rod 22, and the bolt 23 is inserted into a lower part of the adjusting rod 22; and a plurality of inserting holes are formed in different mounting surfaces, thereby facilitating multi-directional assembling of the supporting rods and achieving wide application of the clamping position.

Embodiment 2

Figure 11:
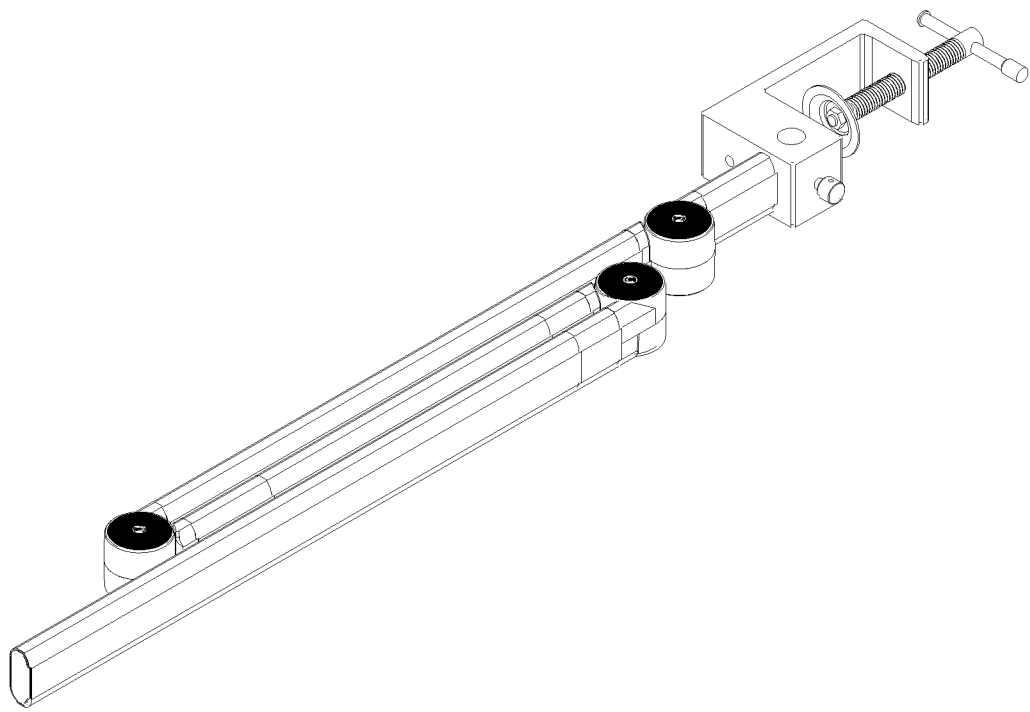
FIG. 11 is a schematic diagram of an overall structure (a folded state) according to Embodiment 2 of the present disclosure.

The structure of Embodiment 2 is basically the same as that of Embodiment 1, except that: an additional rod 12 is not arranged at a lower end of one side of the lamp base part, and the lamp base part 1 is movably connected to the uppermost one of the supporting rods 3 directly through the detachable rotating shaft assembly 4, as shown in FIG. 11.

The foregoing, is merely illustrative of the preferred embodiments of the present disclosure and is not intended to limit the present disclosure, and various changes and modifications may be made by those skilled in the art. Any modifications, equivalent substitutions, improvements, etc. made within the spirit and scope of the present disclosure should be included within the protection scope of the present disclosure.

What is claimed is:

1. A foldable clamp-on desk lamp with a multi-angle adjustment function, comprising:
    a lamp base part,
    a clamping base,
    several supporting rods, and
    detachable rotating shaft assemblies, wherein
    the several supporting rods are movably connected through the detachable rotating shaft assemblies, the lamp base part is connected to an uppermost one of the several supporting rods through the detachable rotating shaft assemblies, and a lowermost one of the several supporting rods is detachably connected to the clamping base;
    wherein each of the detachable rotating shaft assemblies comprises a hexagonal rotating shaft; the hexagonal rotating shaft comprises a hexagonal bolt, a hexagonal rotating piece sleeved on the hexagonal bolt and a hexagonal nut.

2. The foldable clamp-on desk lamp with the multi-angle adjustment function according to claim 1, wherein each of the detachable rotating shaft assemblies further comprises a first fastener and a second fastener, and the hexagonal rotating shaft is configured to connect the first fastener and the second fastener.

3. The foldable clamp-on desk lamp with the multi-angle adjustment function according to claim 2, wherein a moment of the rotating shaft is adjusted through threaded connection between the hexagonal nut and the hexagonal bolt.

4. The foldable clamp-on desk lamp with the multi-angle adjustment function according to claim 3, wherein the first fastener comprises a first connecting head part and a first connecting rod part, the first connecting head part being provided with a first hexagonal hole and a circular hole sequentially from outside to inside, the first hexagonal hole being in matched connection with the hexagonal rotating piece, a first plug cover being arranged on an outer side of the first connecting head part, and the first connecting rod part being in inserted connection with the corresponding supporting rod.

5. The foldable clamp-on desk lamp with the multi-angle adjustment function according to claim 4, wherein a distance between opposite sides of the first hexagonal hole is greater than a diameter of the circular hole.

6. The foldable clamp-on desk lamp with the multi-angle adjustment function according to claim 3, wherein the second fastener comprises a second connecting head part and a second connecting rod part, a second hexagonal hole being formed in an inner side of the second connecting head part, the second hexagonal hole being in matched connection with a head end of the hexagonal bolt, a second plug cover being arranged on an outer side of the second connecting head part, and the second connecting rod part being in inserted connection with the corresponding supporting rod.

7. The foldable clamp-on desk lamp with the multi-angle adjustment function according to claim 1, wherein a light source is arranged in the lamp base part, the light source adopts a Fresnel optical lens, and the Fresnel optical lens is provided with a plurality of convolutional lines.

8. The foldable clamp-on desk lamp with the multi-angle adjustment function according to claim 1, wherein a rear projection lamp is arranged on a first supporting rod from top to bottom, and a touch switch is arranged on a second supporting rod.

9. The foldable clamp-on desk lamp with the multi-angle adjustment function according to claim 1, wherein a lower end of one side of the lamp base part is vertically connected to an additional rod, and a lower end of the additional rod is movably connected to the uppermost one of the supporting rods through the detachable rotating shaft assemblies.

10. The foldable clamp-on desk lamp with the multi-angle adjustment function according to claim 1, wherein the clamping base comprises a U-shaped base, an adjusting rod, a bolt and a pressing plate, a plurality of inserting holes and locking holes being formed in an upper side and top end of the U-shaped base, an inserting rod being arranged below the lowermost one of the supporting rods, the inserting rod being inserted into the inserting hole and is in threaded connection with the locking hole through a locking nail to be locked and fixed, a lower part of the U-shaped base being provided with a threaded hole and being in threaded connection with the adjusting rod, the pressing plate being fixed above the adjusting rod, and the bolt being inserted in a lower part of the adjusting rod.

* * * * *